Aug. 14, 1956    J. T. M. SCHLAMANN    2,758,576
INTERNAL COMBUSTION ENGINE WITH ANTE-CHAMBER
AND METHOD OF OPERATING SAME
Filed April 14, 1952    2 Sheets-Sheet 1

Inventor:
Johannes T. M. Schlamann
By: Oswald H. Milmore
His Attorney

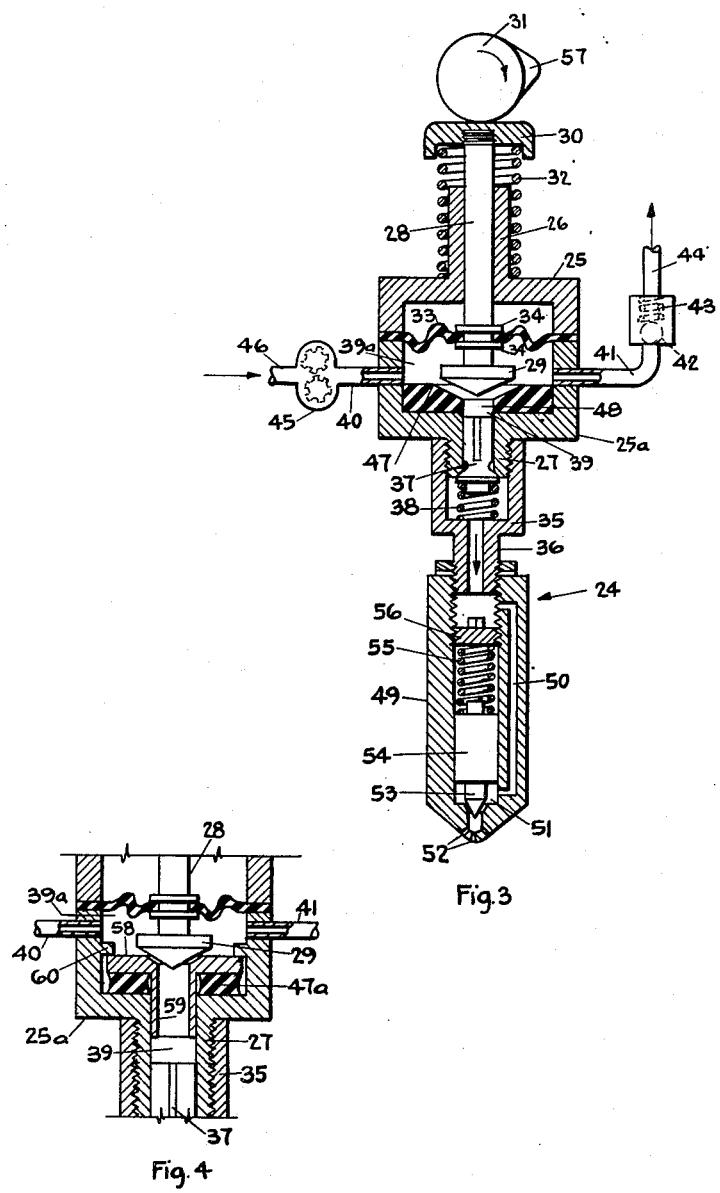

United States Patent Office 2,758,576
Patented Aug. 14, 1956

2,758,576
INTERNAL COMBUSTION ENGINE WITH ANTE-CHAMBER AND METHOD OF OPERATING SAME

Johannes T. M. Schlamann, Delft, Netherlands, assignor to Shell Development Company, Emeryville, Calif., a corporation of Delaware Application April 14, 1952, Serial No. 282,176

Claims priority, application Netherlands April 20, 1951

5 Claims. (Cl. 123—27)

This invention relates to mixture-compressing internal combustion engines operating either on a two-stroke cycle or on a four-stroke cycle operating on volatile fuel (gasoline or more volatile fuel) having a compression-combustion chamber that includes a main combustion chamber and an auxiliary combustion chamber, herein called an ante-chamber, communicating with the main chamber and equipped with a suitable ignition device such as a spark plug, each of said chambers having valve-controlled inlets for the admission of fuel in independently controllable amounts and at least one of said chambers having a valve-controlled inlet passage for air, which may be the same as the fuel inlet or in addition thereto. The invention further relates to a method of operating two-stroke cycle and four-stroke cycle internal combustion engines of the type described above wherein a rich, ignitable fuel-air mixture is provided in the ante-chamber under all load conditions and the fuel-air ratio of the mixture in the main chamber is varied in accordance with the load on the engine.

When operating mixture-compressing internal combustion engines, fuel-air mixtures of stoichiometrical or almost stoichiometrical composition are used and with four-stroke cycle engines the output is usually controlled quantitatively, which entails the disadvantage that when running under partial load the thermal efficiency of the cycle is lower than the thermal efficiency that may be expected from a qualitative control of the fuel-air ratio. Means for effecting a qualitative control by varying the composition of the fuel-air mixture simultaneously with the quantitative control of the mixture admitted to the engine are already known; in such cases the composition of the mixture is made leaner when operating under partial load than at full load. The degree to which the composition can be made leaner is restricted, however, by the phenomenon that if further impoverished the mixture will not be ignited regularly and that with still further impoverishment it does not ignite at all. With mixture-compressing, two-stroke cycle engines the output is usually regulated qualitatively in the sense that a smaller quantity of the fresh fuel-air mixture of stoichiometrical or almost stoichiometrical composition is supplemented and mixed with a correspondingly larger quantity of gas remaining in the engine cylinder from the preceding cycle of operation. With a low load, after a power stroke, the composite mixture of fresh charge and residual combustion products in the engine cylinder becomes too poor to ignite, so that one or more strokes misfire until the mixture in the cylinder, repeatedly enriched by the fresh mixture supplied—which thereby often acquires a composition richer than stoichiometrical—has become rich enough to insure ignition. With a low load this misfiring of power strokes or "four stroking," as it is sometimes called, wholly or partially nullifies the advantage with regard to fuel consumption resulting from the qualitative control.

The main object of the invention is to enable a complete qualitative control to be employed in internal combustion engines of the character described. A further object is to provide an engine and a method of internal engine operation wherein the tendency to detonation or knocking is greatly reduced, thereby permitting the use of fuels of low anti-knock rating and/or to permit the use of higher compression ratios without detonation.

The foregoing and other objects, which will be apparent to those skilled in the art from the following description, are attained in accordance with the invention by supplying fuel directly both to the main chamber and to a smaller ante-chamber that communicates with the main chamber and supplying combustion air at least to the main chamber and, optionally, also to the ante-chamber, the fuel supplied to the ante-chamber being admitted alone during a low pressure part of the compression stroke and the fuel supplied to the main chamber being preferably admitted as a fuel-air mixture, and the supply of fuel and air being regulated in such a way at the end of the compression stroke a poor mixture (which may under certain operating conditions, such as zero load, consist almost entirely of air) is present in the main chamber while a rich mixture is present in the ante-chamber; the latter mixture is ignited by any suitable ignition device, such as one providing a high- or low-tension spark. It should be understood that the fuel and/or the air may be supplied to either or both chambers at more than one point therein, e. g., through a plurality of ports or slots, as are usual in two-stroke cycle engine constructions. The quantity of fuel supplied during each cycle to the main chamber is varied in accordance with the load on the engine, thereby controlling the richness of the compression mixture that occurs in the main chamber at the end of the compression stroke; however, the amount is limited so that the said compression mixture is poor under all operating conditions, i. e., contains appreciably less than the stoichiometrical amount of fuel, preferably under 80%. The quantity of fuel supplied during each cycle to the ante-chamber is advantageously constant or substantially so, as will be described hereinafter. The total quantity of air supplied during each cycle is substantially constant under all operating conditions.

The danger of non-ignition will not be present even with a low load or under no-load conditions, when little or no fuel is admitted directly to the main chamber, for there is, under all conditions, a rich, ignitable mixture in the ante-chamber wherein ignition is initiated. Full qualitative control can, therefore, be obtained by influencing the composition of the poor mixture in the main chamber.

A further advantage of the invention is that the danger of detonation is considerably reduced. This occurs because the mixture that burns last, the so-called end gas which is displaced during the combustion progressing from the point of ignition and which is, therefore, compressed by the increasing volume of gases already burnt and still being burnt, is so lean that it is capable of undergoing high compression without there being danger that its temperature and pressure will become so high that the end gas will burn simultaneously or almost simultaneously at all places. Such simultaneous burning would cause a "combustion knock" which is characteristic of detonation.

An important feature of the invention is the injection of the fuel into the ante-chamber during the compression stroke. In methods previously proposed, wherein a rich fuel-air mixture during the suction stroke, the composition of the mixture in the ante-chamber was subjected to irregular fluctuations by partial escape of the rich mixture from the ante-chamber and by dilution with air or with a part of the lean mixture from the main chamber. In accordance with the instant invention substantially no fuel escapes from the ante-chamber, and the engine operates as intended under all operating conditions.

An engine which is suitable for carrying out this method is provided with an ante-chamber or pre-chamber that is smaller than the volume of the main chamber at the end of the compression stroke and communicates with the main chamber through a constricted passageway; the rich mixture is supplied to this ante-chamber, e. g., is formed therein, and the ignition is initiated therein. To these ends this ante-chamber is provided with a fuel supply device and with a suitable ignition device; the fuel supply device can be very simple, for example, it may be a low pressure fuel pump, as the supply of fuel for forming the rich mixture takes place at low cylinder pressure, as will be explained below in greater detail.

The invention can be applied both when gaseous fuel and when liquid fuel is used, and may be used both with four-stroke cycle and with two-stroke cycle engines.

Having thus indicated the general nature of the invention, further details thereof, together with further advantages and characteristics of the engine and method, will be presented in connection with the accompanying drawings forming a part of this specification and illustrating diagrammatically certain preferred exemplary embodiments thereof, wherein:

Figure 3 is an enlarged vertical section of the fuel pump and injector;

Figure 4 is a vertical sectional view of a portion of Figure 3 showing a modification of the pump.

Figure 1:
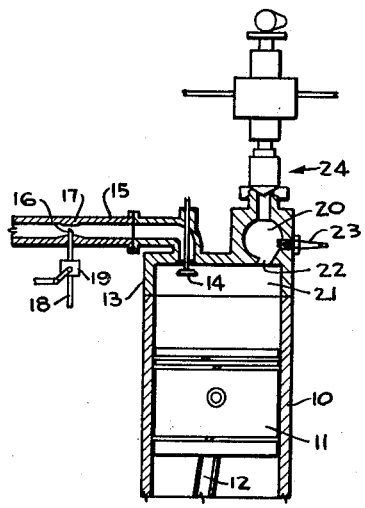
Figures 1 and 2 are vertical sectional views through four-stroke cycle engines constructed according to the invention suitable for operating on liquid and gaseous fuel, respectively.

Referring to Figure 1 of the drawings showing a four-stroke cycle engine, 10 is the engine cylinder, within which a piston 11 having a connecting rod 12 is vertically reciprocable. The cylinder head 13 has an intake valve 14 of usual construction and operated from the usual camshaft (not shown) for controlling influx of air from an air duct 15, which may be part of a manifold. The air is carburetted with liquid fuel, e. g., gasoline, by a carburetor of any suitable design, such as a constriction 16 in the air duct and a liquid fuel nozzle 17. It is a feature of the invention that the rate at which fuel is supplied through the nozzle 17 is controllable independently of the rate of flow of air and to this end the nozzle is connected to a fuel supply pipe 18 provided with a throttle valve 19, fuel being supplied to the pipe at a constant or controlled variable pressure from any suitable source such as a fuel pump. It will be understood that the cylinder head is further provided with the usual exhaust valve, not visible in the sectional view of the drawing.

The cylinder head has an ante-chamber or pre-chamber 20 communicating with the main combustion chamber 21 by a constricted passageway 22. The dimensions of the ante-chamber 20 are preferably such that its volume lies between 15% and 35% of the minimum total volume of the composite combustion or compression chamber (i. e., the sum of the volumes of the chambers 20 and 21 when the piston 11 is at top dead center). The pre-chamber is fitted with a suitable ignition device, such as a spark plug 23 and with a liquid fuel injection device indicated generally at 24 and provided with means for admitting a controlled quantity of fuel at a predetermined time of each cycle as described below. The supply of fuel may be controlled by any of a variety of injectors adapted to inject fuel in timed relation to the piston strokes and the invention is not limited to the preferred embodiment to be described, which employs a low pressure fuel pump operated in synchronism with the engine.

Referring to Figure 3, the injector pump comprises a casing formed of mating upper and lower sections 25 and 25a shaped to provide an integral upstanding cylindrical tube 26 and an integral depending, externally threaded discharge tube 27. A plunger 28 is vertically slidable within the bore of the tube 26 and has an enlarged, stamp-shaped head or piston plunger 29 which is advantageously conical as shown. The upper end of the plunger is fitted with a cap or cam follower 30, which is kept permanently pressed against a cam 31 operated in synchronism with the engine at half the speed of the crankshaft by the action of a helical compression spring 32. The upper part of the plunger is sealed off from the lower part by a flexible diaphragm 33 which is clamped between the sections 25 and 25a and is sealed to the plunger by collars 34.

A valve housing 35 is threaded to the tube 27 and has a fuel outlet tube 36. A non-return valve 37, loaded by a helical compression spring 38, has the enlarged head thereof seated against the bottom of the tube 27 and the fluted stem thereof slidable within the tube. The valve 37 thus serves to close the bottom of a pump discharge chamber or space 39.

Fuel under low or moderate pressure is admitted to the inlet chamber 39a beneath the diaphragm 33 through a supply duct 40 to maintain a pressure insufficient to open the valve 37. According to a preferred arrangement, the fuel pressure in this space is controlled by venting fuel as required therefrom through an outlet duct 41 having a pressure relief overflow valve 42 loaded by a compression spring 43 and connected to a discharge duct 44 by which excess fuel is returned to the fuel tank. Fuel may be supplied by a fuel pump, such as a gear pump 45 having a suction intake 46 at a rate slightly greater than the pump delivery rate.

The lower wall of the inlet chamber 39a has a wall section of highly elastic material. In the embodiment of Figure 3 this is effected by fitting a layer 47 of appreciable thickness of elastic material having a composition resistant to the liquid to be pumped; for handling gasoline it is preferred to use synthetic rubber, such as materials known by the trade name neoprene or Acril. The layer 47 has a hole 48 in alignment with the bore of the tube 27; this hole may be conically countersunk from the top to conform to the shape of the stamp-shaped plunger 29.

A tubular injector housing 49 having a central bore is screwed to the bottom of the outlet tube 36. The housing has a passageway 50 communicating with the bore of the outlet tube 36 and with the bottom of the bore at 51. The bore has final orifices 52 which are normally closed by a vertically reciprocable tip valve 53 formed integrally with a piston 54 which is loaded by a compression spring 55 retained by a screw plug 56.

The pump operates as follows: By means of the pump 45 the pump chambers 39 and 39a are kept continuously filled and the construction is such that any excess pressure set up by the action of the pump 45 causes the overflow valve 42 to open sooner than the non-return valve 37. The plunger 28 is periodically depressed by the cam 31, making one stroke each time the lobe 57 thereof engages the cap 30. After the plunger has completed a part of its stroke the head 29 thereof engages the elastic wall and closes the top of the hole 48; this isolates the discharge pump chamber 39 from the inlet chamber 39a. During the subsequent part of the downward stroke the plunger elastically compresses and deforms the wall 47; this reduces the volume of the hole 48 and chamber 39. The liquid trapped in the latter is thereby subjected to increased pressure which opens the valve 37 and results in the flow of a definite quantity of liquid from the outlet tube 36 into the passageway 50. This in turn increases the pressure in the space 51 and causes the piston 54 to rise, lifting the tip valve 53 and permitting fuel to be discharged into the ante-chamber 20 as a spray. At the end of the downward stroke of the plunger 28 the valves 53 and 37 are closed by the actions of their springs. The quantity of fuel injected during each stroke is virtually dependent on the length of that part of the stroke of the plunger during which the plunger compresses the elastic wall 47 and this part of the stroke is limited by the maximum deformation which the elastic wall can accommodate without unduly high deformation. A variation in the length of the stroke is possible within certain limits, and thus it is possible to control the amount of liquid to be delivered by each stroke. This control can be effected simply by, for example, altering the position of the camshaft or the height of the cam.

As soon as the plunger 28, during its return stroke, no longer blocks the hole 48 in the elastic wall 47, the liquid in chamber 39 is supplemented by liquid from chamber 39a, the valve 37 being already closed by this time since the spring 38 is sufficiently stiff to overcome the greatest pressure permitted in the chamber 39a by the overflow valve 42. It is evident that the stiffness of the spring 38 also has a certain amount of influence on the quantity of liquid delivered per stroke.

In the modified embodiment of the pump shown in Figure 4, wherein like reference numbers denote parts corresponding to parts described for Figure 3, the elastic wall section 47a is separated from the plunger 29 by a metal spacer 58 having a dependent sleeve 59 formed integrally therewith and vertically slidable within the bore of the tube 27. A stop ring 60, secured to the side wall of the casing section 25a, limits the upward travel of the spacer. The upper edge of the sleeve is bevelled as shown. The operation of this pump is identical in principle to that previously described but the plunger 29 does not physically engage the elastic wall section 47a; instead, it seats on the upper, bevelled edge of the sleeve, thereby isolating the discharge pump chamber 39 from the inlet chamber 39a, and upon continued downward movement it moves the spacer downwards, thereby elastically compressing the wall section 47a and reducing the volume of the chamber 39. When the plunger is retracted the wall section 47a restores the spacer 58 to the position shown in the drawing. The stop ring 60 prevents the spacer from following the continued upward movement of the plunger. The advantage of this construction is that, as regards the quality of the elastic wall section, the possibility of this section's being attacked by the liquid to be pumped is reduced because the part thereof engaged by the plunger does not come into contact with the liquid. Further, wear of the elastic section by contact with the plunger is obviated.

The operation of the engine shown in Figure 1 can now be explained. During the outward or suction stroke of the piston 11 the intake valve 14 is opened and air at atmospheric pressure containing a variable amount of fuel is admitted into the main chamber 21. The air duct 15 is constructed to admit substantially constant charges of air during each suction stroke regardless of operating conditions, and no throttling of this duct is effected with varying engine conditions, although it will be understood that the size of the duct or of the air inlet may be initially adjusted and that some variation in the air charge will unavoidably occur due to changes in pressure losses occurring in the duct at varying engine speeds. The richness of the mixture admitted through the valve 14 is adjusted by controlling the amount of fuel discharged from the nozzle 17, e. g., by means of the valve 19. When the engine is operating under zero load a very small quantity of fuel only may be discharged or the valve 19 may be closed entirely. The intake valve 14 is closed during the compression stroke; during this stroke a part of the admitted air or lean air-fuel mixture enters the ante-chamber 20.

Subsequent to the admission of the air, preferably during the early part of the compression stroke of the piston and while the pressure within the compression space is still low (e. g., during the first half of this stroke) a rich mixture is formed in the ante-chamber 20 by admitting liquid fuel directly into this chamber from the injection device 24, the cam 31 being oriented on the cam shaft to effect the proper timing. The quantity of fuel admitted is regulated in relation to the air charge so that a rich, readily ignitable mixture is formed in the ante-chamber under all conditions of power demand. This quantity of fuel is advantageously constant under all engine operating conditions; except that the quantity may be reduced somewhat, by a maximum of 40%, to obtain best efficiencies at very high loads when the air admitted during the suction stroke is comparatively rich. Such reduction may be effected, e. g., by raising axis of the cam 31 to reduce the stroke of the plunger 28, as described above; such a mechanical arrangement being well known, it is not necessary to describe it further.

The spark plug 23 is fired to ignite the rich mixture in the ante-chamber to about the end of the compression stroke. Owing to the rich composition of the mixture in the ante-chamber this ignition will occur readily under all operating conditions. The combustion is easily propagated to the lean mixture in the main combustion chamber 21. The burning gaseous mixture in the ante-chamber will expand owing to the increased temperature and flow through the passageway 22 with a high velocity sufficient to penetrate the charge in the main combustion chamber; this outward flow increases from the instant that the outward stroke of the piston begins. The concomitant intensive movements and turbulence insure a good transfer of the combustion to the lean mixture.

The composition of the lean mixture supplied via the intake valve 14 is adjusted in accordance with the power demand on the engine. The valve 19 or other device used to regulate the rate of fuel flow is so set in relation to the air charge that the fuel content is always less than 80% of the stoichiometric amount of fuel required for complete combustion; this is, therefore, the composition of the lean mixture at full load conditions. In operating according to this invention only the rich mixture in the ante-chamber 20 has a stoichiometrical or almost stoichiometrical composition. Hence the substantially constant quantity of fuel admitted to the ante-chamber during each cycle is approximately 15–35% of the total fuel charge required at full load. If too much fuel is supplied to the ante-chamber an uneconomical consumption of fuel results; if too little is supplied a good ignition will not be obtained under all conditions. By operating within the stated limits good ignition and good transfer of the ignition from the ante-chamber to the lean mixture are assured, down to the 15% limit when a small ante-chamber is used.

Moreover, if too much fuel is used for forming the rich mixture, detonation may result; the composition of the whole mixture, that is, the rich and lean mixtures together, may then be such that a slight mixing of these mixtures by diffusion or otherwise may give the lean mixture a composition that is rich enough to cause sudden combustion and detonation in the end gas when the latter is compressed by the expansion of the burning mixture. This danger also exists when the composition of the lean mixture is made too rich. These dangers are avoided by abiding with the stated limits, i. e., by never charging over 35% of the total fuel corresponding to full load conditions to the ante-chamber and limiting the richness of the lean mixture to 80% of the stoichiometrical composition.

Figure 2:
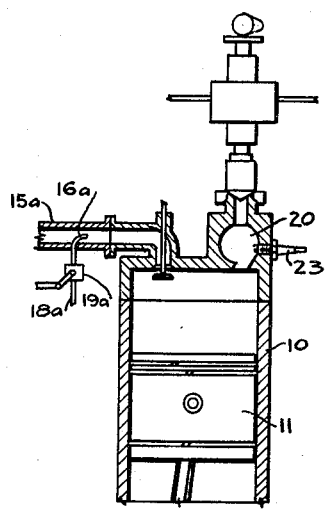

The invention can also be applied to engines using gaseous fuel. As shown in Figure 2, a four-stroke cycle engine for this purpose may differ from that shown in Figure 1 only in that the air duct 15a is provided with a gas mixing nozzle 16a instead of a fuel jet, this nozzle being supplied with gaseous fuel, such as a normally gaseous hydrocarbon, from a suitable source, such as a constant or controlled pressure source, by a gas supply pipe 18a at a rate regulated by a throttle valve 19a.

The invention is applicable both to four-stroke cycle and to two-stroke cycle systems. In the latter the air for the lean mixture, e. g., after admixture with fuel, should be compressed in a pre-compressor in the usual way, and it is usually advantageous to locate the inlet and exhaust ports at axially separated points so that one of these is controlled by the piston and uncovered at or near the outward stroke thereof, whereby scavenging is effected through displacement of the burnt gases by the entering fresh lean mixture. In the embodiment to be described by way of illustration in connection with Figure 5, the inlet port is piston-controlled and the air is initially compressed within the crank case, thereby employing crank case scavenging, but the invention is, of course, not limited to this arrangement.

Figure 5:
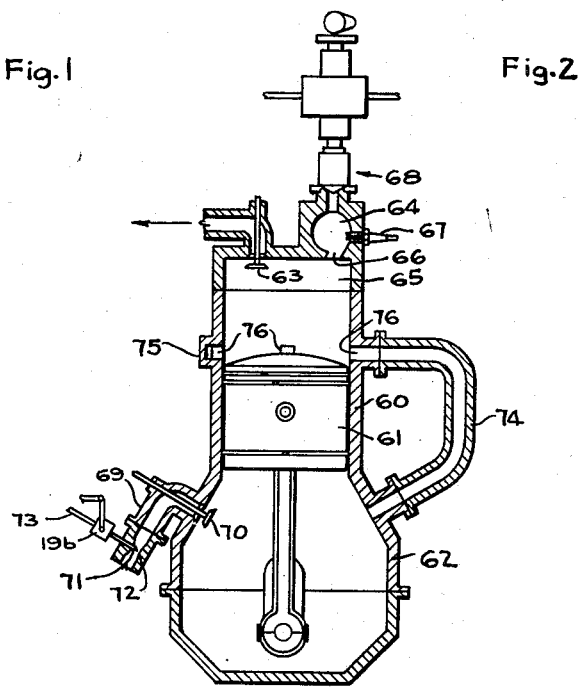
Figure 5 is a vertical sectional view through a two-stroke cycle engine also constructed according to the invention.

Referring to Figure 5, the engine has a cylinder 60, a piston 61, a crank case 62, and a cylinder head. The last has an exhaust valve 63 and an ante-chamber 64 communicating with the main combustion chamber 65 through a constricted passageway 66 and having an ignition device 67 and a fuel injection device 68, the parts 64 to 68 being as previously described for parts 20—24, respectively. An air duct 69 having a cam-actuated intake valve 70 is connected to the crank case and liquid fuel is admitted from a nozzle 71 situated in a constriction 72 and supplied with fuel from a pipe 73 at a rate controlled by a throttle valve 19b. (It should be understood that the arrangement of Figure 2 for admitting a gaseous fuel may be substituted for the liquid fuel carbureter shown.) The crank case is connected to the lower part of the cylinder by a conduit 74 that communicates with an annular channel 75 having a ring of ports 76; these ports are uncovered by the piston when the latter is at its outward stroke as shown and are covered when the piston moves inward.

In operation, air substantially at atmospheric pressure or compressed in a separate compressor—not shown—is admitted into the crank case on each compression or inward stroke of the piston through the valve 70, and a variable amount of fuel is admitted through the nozzle 71 to form a lean mixture satisfying the requirements previously indicated. During the power or outward stroke of the piston this lean mixture is compressed in the crank case and when the ports 76 are uncovered it flows through the conduit 74 into the engine cylinder. The exhaust valve 63 opens at about the time that these ports are uncovered, whereby the combustion products displaced by the lean mixture flow upwardly through the cylinder and escape through the exhaust valve. When the exhaust valve closes the air or lean mixture is compressed above the piston and a part of it enters the ante-chamber 64. During the early part of the compression stroke, that is, directly after the inlet ports 76 have been closed by the piston and the exhaust valve 63 has been closed, fuel supply for the rich mixture in the ante-chamber 64 takes place by means of the injector 68. The spark plug 67 is fired at about the end of the compression stroke or slightly ahead of top dead center. Flame propagation occurs as previously described.

The control of the fuel flow to the engine in all embodiments can always be effected by means of the throttle valve 19, 19a or 19b and it is evident that this control does not influence the amount of air admitted to the engine cylinder so that the control takes place exclusively qualitatively. The thermal efficiency of the process is favorable, because the medium with which the cycle is carried out consists at low loads substantially of air which, owing to its thermal properties, notably the ratio of the specific heats at constant pressure and constant volume ($C_p:C_v$), has a greater thermal efficiency in a cyclic process than a fuel-air mixture of almost stoichiometric composition. Moreover, the pumping losses, which with quantitative control are the result of throttling in the supply conduit, are avoided.

The prior disadvantages of qualitative control of the fuel-air mixture, such as, among other things, the low rate of combustion with lean mixtures, whereby late combustion takes place, and the uncertainty of ignition, are eliminated by the invention, as will be clear from the foregoing. Proper operation is, further, not dependent upon precise control of the timing of the fuel admission to the ante-chamber.

Furthermore when the two-stroke cycle is used, there is a further advantage that with a zero load, therefore with the valve 19b closed or substantially closed, scavenging can be effected exclusively with air or with a very lean mixture, so that there is practically no fuel loss; this has a favorable effect on the fuel consumption. The so-called "four stroking" will not occur with a zero load either, as even under no-load conditions the mixture in the ante-chamber will be rich enough to insure its ignition by the spark plug 67.

By injecting the fuel into the ante-chamber only after the commencement of the compression stroke the inter-diffusion between the rich and lean mixture is minimized because the compression of the lean mixture during and subsequent to the said injection causes an influx of air or of the lean mixture through the restricted passageway 22 into the ante-chamber; only in this manner can the advantages according to the invention be realized. Further, by admitting the liquid fuel early during the compression stroke the pump need not operate under high pressures and a small diaphragm pump such as those shown in Figures 3 and 4 can be used.

The injection valve 53 constitutes means to isolate the fuel supply system from the combustion chamber and to insure admission of the fuel at the desired instant, as determined by the pressure rise caused by the pump; it therefore does not act as a control valve to regulate the amount of fuel under different running conditions, although the invention does exclude this supplementary possibility of control under maximum load conditions, as was previously noted.

Although, as was noted previously, the flow of air through the air duct 15, 15a or 69 is not varied with different load conditions, the invention does not exclude the possibility of throttling such flow as a supplementary control under zero load conditions whereby the engine can have a negative output.

The considerable decrease in the danger of detonation allows the compression ratio to be high, for example 1:10, so that the thermal efficiency can become higher than with the normal gasoline engine, with the result that there is a higher torque at full load and a lower gasoline consumption over the entire range of loads.

The pump according to Figures 3 and 4 is claimed in my continuing application Ser. No. 328,170, filed December 27, 1952, now Patent 2,714,853, issued August 9, 1955.

I claim as my invention:

1. The method in the operation of an internal combustion engine of the type described having a power cylinder providing a main combustion chamber and an ante-chamber as herein defined which comprises forming a fuel vapor-air mixture of varying fuel-air ratio, said ratio of fuel to air being constantly varied as the power demanded of the internal combustion engine is varied, introducing a constant volume of said mixture into the cylinder through an intake valve, compressing said fuel vapor-air mixture, injecting a substantially constant volume of fuel into said ante-chamber during said compressing at a temperature and pressure such that at least a portion of the fuel vaporizes and forms with a portion of said fuel vapor-air mixture a spark-ignitable mixture in the ante-chamber, immediately spark igniting said combustible mixture to establish a burning gas stream of high velocity traveling from the ante-chamber into the main combustion chamber, causing said burning stream to penetrate the portion of said fuel vapor-air mixture in the main combustion chamber so that said fuel vapor-air mixture is ignited and burned without combustion knock.

2. The method according to claim 1 wherein the fuel vapor to air ratio of the fuel vapor-air mixture aspirated is such that the mixture initially introduced into the main combustion chamber contains less than 80% of the stoichiometrical amount of fuel required for complete combustion.

3. An internal combustion engine of the character described comprising a power cylinder having a piston operating therein and providing a main combustion chamber and an ante-chamber as herein defined, a carburetting means for creating a fuel vapor-air mixture of continually varying fuel-air ratio, an intake valve for said cylinder adapted to introduce said fuel vapor-air mixture into the cylinder, a fuel injection nozzle adapted to supply fuel into the ante-chamber in substantially constant volume at such temperature and pressure that at least a portion of the injected fuel vaporizes rapidly and forms with a portion of said fuel vapor-air mixture a localized combustible fuel vapor-air mixture with only a short travel of the fuel from the nozzle, a spark ignition device having electrodes in the ante-chamber to ignite said combustible fuel vapor-air mixture as soon as the same is formed to establish a burning gaseous mixture of high velocity traveling into said main combustion chamber to penetrate the vapor-air mixture therein whereby the fuel vapor-air mixture is ignited and burned without combustion knock.

4. An internal combustion engine according to claim 3 in which the ante-chamber is between 15% and 35% of the total volume of the combined volume of the main combustion chamber and the ante-chamber.

5. In a spark ignition engine of the character described: a cylinder and piston defining a cylinder working space, an ante-chamber combustion space, means affording restricted communication between said spaces, a fuel injector for admitting a fixed volume of volatile fuel to said ante-chamber combustion space during the compression stroke of the piston, a valve adapted and arranged to control admission of a constant volume of fuel vapor-air mixture to the cylinder working space during the induction stroke, a volatile fuel and air mixing device, and a controller in said device for continuously changing the richness of the fuel vapor-air mixture admitted through said valve in accordance with the work demanded of the engine.

References Cited in the file of this patent

UNITED STATES PATENTS

| | | |
|---|---|---|
| 1,096,405 | Thomson | May 12, 1914 |
| 1,406,877 | Lemaire | Feb. 14, 1922 |
| 1,616,157 | Werner | Feb. 1, 1927 |
| 1,659,860 | Denholm | Feb. 21, 1928 |
| 2,000,903 | Lehmann | May 14, 1935 |
| 2,054,413 | Fisher et al. | Sept. 15, 1936 |
| 2,142,280 | Mock | Jan. 3, 1939 |
| 2,184,357 | Mallory | Dec. 26, 1939 |
| 2,430,545 | Wesley | Nov. 11, 1947 |
| 2,518,400 | Thompson | Aug. 8, 1950 |
| 2,562,511 | Schowalter | July 31, 1951 |
| 2,615,437 | Broderson | Oct. 28, 1952 |

FOREIGN PATENTS

| | | |
|---|---|---|
| 902,433 | France | Aug. 30, 1945 |